United States Patent
Kikuchi

(10) Patent No.: US 8,035,365 B2
(45) Date of Patent: Oct. 11, 2011

(54) DC CONVERTER WHICH HAS SWITCHING CONTROL UNIT TO SELECT PWM SIGNAL OR PFM SIGNAL

(75) Inventor: Hidehiro Kikuchi, Kanagawa (JP)

(73) Assignee: Renesas Electronics Corporation, Kawasaki-shi, Kanagawa (JP)

(*) Notice: Subject to any disclaimer, the term of this patent is extended or adjusted under 35 U.S.C. 154(b) by 126 days.

(21) Appl. No.: 12/320,981

(22) Filed: Feb. 10, 2009

(65) Prior Publication Data

US 2009/0218999 A1    Sep. 3, 2009

(30) Foreign Application Priority Data

Mar. 3, 2008  (JP) .................................. 2008-052346

(51) Int. Cl.
  *G05F 1/00*  (2006.01)
(52) U.S. Cl. ........................ 323/282; 323/283
(58) Field of Classification Search ................. 323/271, 323/282, 283, 284, 285
  See application file for complete search history.

(56) References Cited

U.S. PATENT DOCUMENTS

| 5,481,178 | A | 1/1996 | Wilcox et al. | |
| 7,382,114 | B2* | 6/2008 | Groom | 323/271 |
| 7,629,782 | B2* | 12/2009 | Naka | 323/271 |
| 7,679,346 | B2* | 3/2010 | Lin et al. | 323/282 |
| 7,679,348 | B2* | 3/2010 | Sohma | 323/282 |
| 2009/0058388 | A1* | 3/2009 | Kanakubo | 323/288 |

FOREIGN PATENT DOCUMENTS

JP  6-303766  10/1994

* cited by examiner

*Primary Examiner* — Adolf Berhane
*Assistant Examiner* — Nguyen Tran
(74) *Attorney, Agent, or Firm* — McGinn Intellectual Property Law Group, PLLC

(57) ABSTRACT

A DC (direct current) converter includes a PWM (pulse width modulation) pulse generation unit outputting a PWM pulse signal whose duty ratio is controlled in accordance with an output voltage, a PFM (pulse frequency modulation) pulse generation unit outputting a PFM pulse signal whose pulse output interval is controlled in accordance with an output voltage, a selection circuit selecting and outputting any one of the PWM pulse signal and the PFM pulse signal in response to a selection signal, a drive circuit unit driving a load and generating an output voltage on the basis of a signal outputted from the selection circuit, and a switching control unit outputting the selection signal. When the selection signal is in a second state, the switching control unit detects a fact that the number of pulses of the PFM pulse signal in a measurement period increases to or above a set value of the maximum number of pulses, and switches the selection signal to a first state.

8 Claims, 8 Drawing Sheets

DC CONVERTER WHICH HAS SWITCHING CONTROL UNIT TO SELECT PWM SIGNAL OR PFM SIGNAL

BACKGROUND OF THE INVENTION

1. Field of the Invention

A DC converter according to the present invention particularly relates to a DC converter which supports a first drive method using a PWM (Pulse Width Modulation) pulse signal and a second drive method using a PFM (Pulse Frequency Modulation) pulse signal.

2. Description of Related Art

In recent years, a DC converter has often been used as a power control circuit in an electronic circuit. A DC converter is a voltage converter which is supplied with a DC voltage as an input voltage and then outputs an output voltage having a different voltage value. As an example of a DC converter, there is a switching regulator generating an output voltage by driving an output transistor on the basis of a pulse signal. Switching regulators are widely used due to the high efficiency of power conversion.

An example of the switching regulator is disclosed in Patent Document 1. FIG. 8 shows a block diagram of a switching regulator 100 described in Patent Document 1. The switching regulator 100 generates a feedback voltage VFB by dividing an output voltage VOUT by means of resistors R111 and R112, comparing the feedback voltage VFB with a reference voltage VREF, and generates a one-shot pulse signal having a fixed off-time. A constant voltage source VOS, a reference circuit 111, a transconductance amplifier 112, a constant current source 113, a current comparator 114, and a one-shot circuit 116 are used to generate the one-shot pulse signal. The one-shot pulse signal is then supplied to a drive circuit 120 via an inverter 117, a NAND circuit 118, and an AND circuit 119. The drive circuit 120 drives a push-pull switch 130 on the basis of the one-shot pulse signal. The push-pull switch 130 generates the output voltage VOUT with use of an inductor L and a capacitor C.

At this point, pulse intervals are set for the one-shot pulse signal on the basis of a difference between the reference voltage VREF and the feedback voltage VFB. A method of driving the push-pull switch 130 on the basis of a signal changing the frequency of a pulse and having a fixed off-period (a fixed high-level period) as described above is called the PFM (Pulse Frequency Modulation) drive method.

In addition, the supply of the one-shot pulse signal to the drive circuit 120 is interrupted in the switching regulator 100 when the output voltage VOUT exceeds a specified voltage. In the example shown in FIG. 8, a hysteresis comparator 115 detects a fact that the output voltage VOUT reached a specified voltage, from the feedback voltage VFB, and puts the NAND circuit 118 and the AND circuit 119 in an interrupted state. Such a drive method using a pulse signal including the no-signal state is called a VFM (Variable Frequency Modulation) drive method.

In the switching regulator 100, the output voltage VOUT is generated by the PFM drive method, and when the voltage VOUT reaches a specified voltage value, a voltage is generated by the VFM drive method. At this point, the push-pull switch 130 is substantially in a stop state during a drive period by the VFM drive method. Such a drive period by the VFM drive method allows a reduction of power consumption in the switching regulator 100.

[Patent Document 1] Japanese Patent Application Publication No. Hei 6-303766

SUMMARY

However, in the PFM drive method, a fixed period of time or longer is required for the period during which the push-pull switch 130 is in an off state. Therefore, there is a problem that an increase in power consumption due to a load RL cannot be accommodated. In other words, there is a problem that the switching regulator 100 described in Patent Document 1 cannot accommodate a wide range of changes in power consumption due to the load RL.

An aspect of the DC converter according to an exemplary aspect of the present invention is a DC converter includes a PWM pulse generation unit outputting a PWM pulse signal whose duty ratio is controlled in accordance with an output voltage, a PFM pulse generation unit outputting a PFM pulse signal whose pulse output interval is controlled in accordance with the output voltage, a selection circuit selecting and outputting any one of the PWM pulse signal and the PFM pulse signal in response to a selection signal, a drive circuit unit driving a load and generating an output voltage on the basis of a signal outputted from the selection signal, and a switching control unit outputting the selection signal. When the selection signal is in a second state which instructs to select the PFM pulse signal, the switching control unit detects a fact that the number of pulses of the PFM pulse signal within one measurement period increases to or above a set value of the maximum number of pulses, and switches the selection signal to a first state which instructs to select the PWM pulse signal. When the selection signal is in the first state which instructs to select the PWM pulse signal, the switching control unit detects a fact that the pulse width of the PWM pulse signal falls to or below a set value of a minimum pulse width, and switches the selection signal to the second state which instructs to select the PWM pulse signal.

According to another exemplary aspect of the DC converter of the present invention, the DC converter detects a decreasing or an increasing tendency of current consumption at a load in accordance with a pulse output interval of PFM pulse signal or the duty ratio of a PWM pulse signal. Moreover, the DC converter can select a drive pulse in accordance with a decreasing and an increasing tendency of current consumption.

Another exemplary aspect of the present invention includes a PWM pulse generation unit outputting a PWM pulse signal whose duty ratio is controlled in accordance with an output voltage, a PFM pulse generation unit outputting a PFM pulse signal whose pulse output interval is controlled in accordance with the output voltage, a selection circuit selecting and outputting any one of the PWM pulse signal and the PFM pulse signal on the basis of a selection signal, a drive circuit unit driving a load and generating an output voltage on the basis of a signal outputted from the selection signal; and a switching control unit outputting the selection signal. When the selection signal the selection signal is in a first state which instructs to select the PWM pulse signal, the switching control unit detects a fact that the pulse width of the PWM pulse signal falls to or bellow a set value of a minimum pulse width and switches the selection signal to switch to a second state which instructs to select the PWM pulse signal.

According to another exemplary aspect of the DC converter of the present invention, the DC converter can detect a decreasing tendency of current consumption at a load in accordance with a fact that power consumption at the load has decreased and the duty ratio of a PWM pulse signal has lowered, and can switch from pulses driving a drive circuit to a PFM pulse signal.

Another exemplary aspect of the present invention includes a PWM pulse generation unit outputting a PWM pulse signal whose duty ratio is controlled in accordance with an output voltage, a PFM pulse generation unit outputting a PFM pulse signal whose pulse output interval is controlled in accordance with the output voltage, a selection circuit selecting and outputting any one of the PWM pulse signal and the PFM pulse signal in accordance with a selection signal, a drive circuit unit driving a load and generating an output voltage on the basis of a signal outputted from the selection signal; and a switching control unit outputting the selection signal. In the case of being in a second state which instructs to select the PFM pulse signal, the switching control unit detects a fact that the number of pulses of the PFM pulse signal within one measurement period increases to or above a set value of the maximum number of pulses, and switches the selection signal to a first state which instructs to select the PWM pulse signal.

According to another exemplary aspect of the DC converter of the present invention, the DC converter can detect an increasing tendency of power consumption at a load in accordance with a fact that power consumption at a load has increased and a pulse output interval of a PFM pulse signal has shortened, and can switch from pulses driving a drive circuit to a PWM pulse signal.

A DC converter according to the exemplary aspects of the present invention can accommodate a wide range of changes in power consumption by selecting a drive pulse in accordance with a state of power consumption.

BRIEF DESCRIPTION OF THE DRAWINGS

The above and other exemplary aspects, advantages and features of the present invention will be more apparent from the following description of certain exemplary embodiments taken in conjunction with the accompanying drawings, in which.

DETAILED DESCRIPTION OF THE EXEMPLARY EMBODIMENTS

Exemplary Embodiment 1

Figure 1:
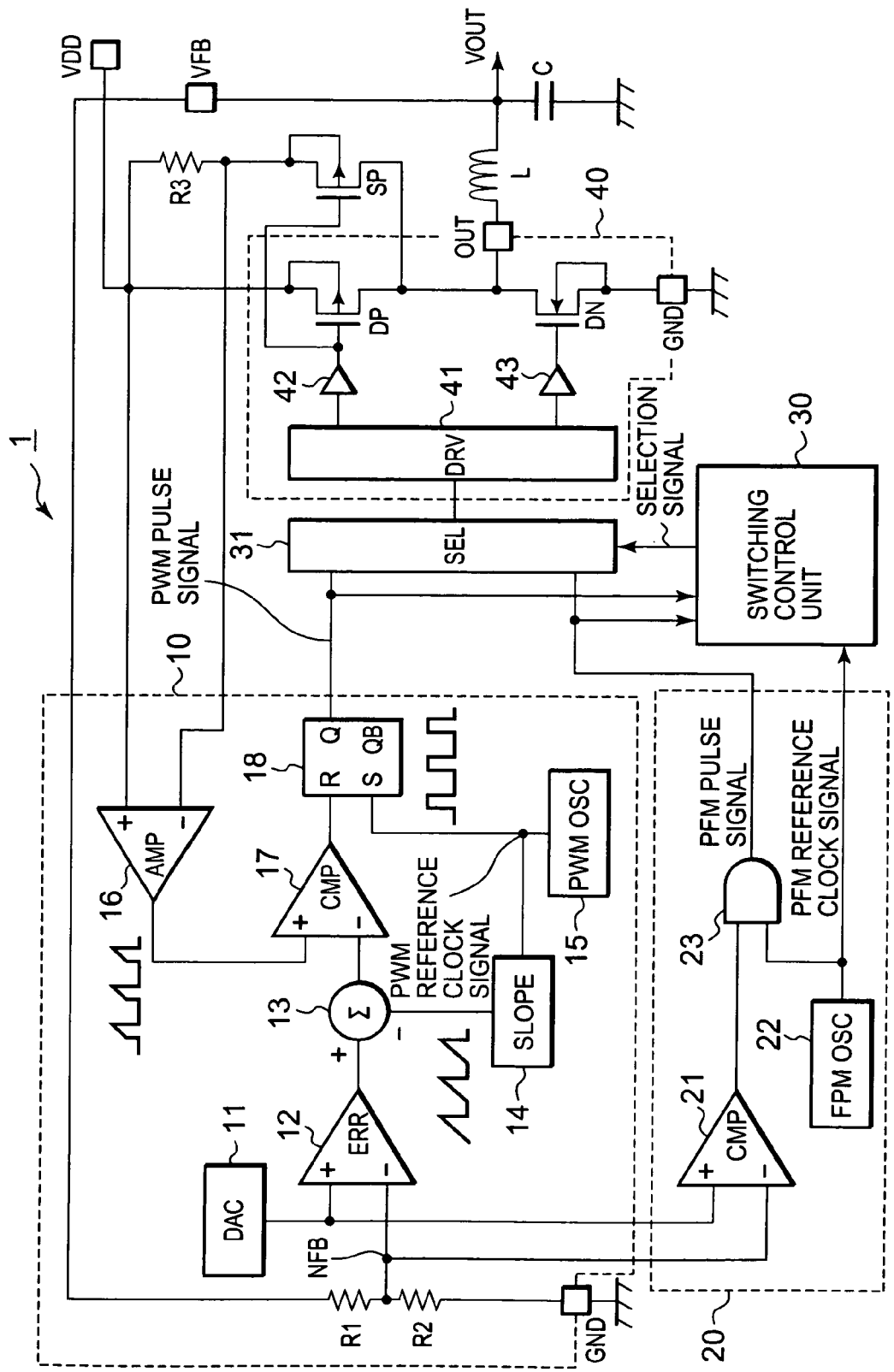
FIG. 1 is a block diagram of a DC converter according to a first exemplary embodiment.

FIG. 1 shows a block diagram of a DC converter 1 according to the exemplary embodiment. As shown in FIG. 1, the DC converter 1 includes a PWM pulse generation unit 10, a PFM pulse generation unit 20, a switching control unit 30, a selection circuit 31, a drive circuit unit 40, a sense transistor SP, and a resistor R3. Furthermore, the DC converter 1 includes a power terminal VDD, a feedback terminal VFB, an output terminal OUT, and a ground terminal GND. An output voltage VOUT is generated by charging a capacitor C via an inductor L connected to the output terminal OUT.

The PWM pulse generation unit 10 outputs a PWM pulse signal whose duty ratio is controlled in accordance with the output voltage VOUT. The PWM pulse generation unit 10 includes resistors R1 and R2, a DAC (Digital Analog Converter) 11, an error amplifier 12, a subtracter 13, a sawtooth wave generation unit 14, a PWM reference clock generation unit 15, an amplifier 16, a comparator 17, and a set/reset latch circuit 18.

The resistors R1 and R2 are connected in series between the feedback terminal VFB and the ground terminal GND. The output voltage VOUT is supplied to one end of the resistor R1 via the feedback terminal VFB, and a ground voltage is given from the ground terminal GND to one end of the resistor R2. The other ends of the resistors R1 and R2 are connected to each other with a node NFB, and the voltage of the node NFB is a feedback voltage.

The DAC 11 converts a set value inputted in a digital signal from the outside to an analog voltage (hereinafter referred to as a set voltage), and outputs the voltage. A non-inverting terminal of the error amplifier 12 is connected to an output of a DAC 12, and an inverting terminal of the error amplifier 12 is connected to the node NFB. The error amplifier 12 amplifies and outputs an error voltage between the set voltage outputted from the DAC 12 and the feedback voltage generated in the node NFB, and outputs the error voltage.

The PWM reference clock generation unit 15 outputs a PWM reference clock signal having a specified frequency. The sawtooth wave generation unit 14 generates a sawtooth wave signal by shaping the waveform of the PWM reference clock signal. The subtractor 13 subtracts a sawtooth wave voltage from the error voltage amplified by the error amplifier 12, and outputs the voltage.

A drain and a gate of the sense transistor SP are connected in common to a PMOS drive transistor DP in the drive circuit unit 40. In addition, a source of the sense transistor SP is connected to the power terminal VDD via the resistor R3. In other words, a current proportional to a current flowing through the PMOS drive transistor DP flows through the sense transistor SP. Accordingly, a voltage generated at both ends of the resistor R3 has a value reflecting the amount of current flowing through the PMOS drive transistor DP. The amplifier 16 amplifies and outputs an error difference generated at both ends of the resistor R3.

An inverting terminal of the comparator 17 is connected to an output of the subtractor 13, and a non-inverting terminal of the comparator 17 is connected to an output of the amplifier 16. The comparator 17 compares a voltage inputted to the inverting terminal and a voltage inputted to the non-inverting terminal, and outputs the comparison result. A reset terminal R of the set/reset latch circuit 18 is connected to an output of the comparator 17, and a set terminal S of the set/reset latch circuit 18 is connected to an output of the PWM reference clock generation unit. Then, the set/reset latch circuit 18 switches a PWM pulse signal outputted from its output terminal Q from the low level to the high level when the rising edge of the PWM reference clock signal is inputted to the set terminal S. On the other hand, the set/reset latch circuit 18 switches the PWM pulse signal outputted from the output terminal Q from the high level to the low level when the rising edge of a signal outputted from the comparator 17 is inputted to the reset terminal S.

In other words, the leading edge of a pulse of the PWM pulse signal outputted by the PWM pulse generation unit 10 synchronizes with the rising edge of the PWM pulse signal, and the falling edge of the pulse thereof is a signal changing by a value of the output voltage VOUT. In other words, the PWM pulse signal is a signal having a fixed cycle in accordance with the frequency of the PWM reference clock signal and a duty ratio changing in accordance with the value of the output voltage VOUT.

The PFM pulse generation unit 20 outputs a PFM pulse signal whose pulse output interval is controlled in accordance with the output voltage VOUT. The PFM pulse generation unit 20 includes a comparator 21, a PFM reference clock generation unit 22, and a gating circuit 23.

A non-inverting terminal of the comparator 21 is connected to an output of the DAC 11, and an inverting terminal of the comparator 21 is connected to the node NFB. Then, the comparator 21 outputs a high level signal if the set voltage outputted by the DAC 11 is higher than the voltage of the node NFB, and outputs a low level signal if the set voltage is lower than the voltage of the node NFB.

The PFM reference clock generation unit 22 outputs a PFM reference clock signal being a reference to the PFM pulse signal. The gating circuit 23 is an AND circuit, for example. One input terminal of the gating circuit 23 is connected to an output of the comparator 21, and the other terminal of the gating circuit 23 is connected to an output of the PFM reference clock generation unit 22. Then, the gating circuit 23 outputs the PFM reference clock signal as the PFM pulse signal when the output of the comparator 21 is a high level signal, and fixes the PFM pulse signal to the low level when the output of the comparator 21 is a low level signal.

In other words, the PFM pulse signal is the PFM reference clock signal, and has a waveform where a pulse signal is thinned out during a period when the output voltage VOUT is higher than a specified value. Note that the PFM reference clock signal is inputted to the switching control unit 30, too.

The PWM pulse signal, the PFM pulse signal and the PFM reference clock signal are inputted to the switching control unit 30, which outputs a selection signal. Then, the switching control unit 30 switches the state of the selection signal between a first and a second state on the basis of the PWM pulse signal and the PFM pulse signal. For example, the switching control unit 30 switches the selection signal to the second state when the pulse width of the PWM signal falls to or below a set value of a minimum pulse width during a period when the selection signal is in the first state. On the other hand, the switching control unit 30 switches the selection signal to the first state when the number of pulses of the PFM pulse signal within a fixed period increases to or above a set value of the maximum number of pulses during a period when the selection signal is in the second state. Note that the DC converter 1 goes into PWM mode operating with the PWM pulse signal when the selection signal is in the first state, and goes into PFM mode operating with the PFM pulse signal when the selection signal is in the second state. Therefore, the first state is called the PWM mode, and the second state is called the PFM mode, in the following descriptions. In addition, detailed descriptions will later be given of the switching control unit 30, the set value of a minimum pulse width, and the set value of the maximum number of pulses.

The PWM pulse signal, the PFM pulse signal and the selection signal are inputted to the selection circuit 31. Then, either the PWM pulse signal or the PFM pulse signal is selected in accordance with the state of the selection signal, and outputs the signal. For example, when the selection signal is in PWM mode, the PWM pulse signal is selected to be outputted, and when the selection signal is in PFM mode, the PFM pulse signal is selected to be outputted.

The drive circuit unit 40 drives the load after receiving the pulse signal outputted by the selection circuit 31 and generates the output voltage VOUT. The drive circuit unit 40 includes a drive control unit 41, buffers 42 and 43, a PMOS drive transistor DP, an NMOS drive transistor DN.

The drive control unit 41 outputs signal for driving the transistors to the buffers 42 and 43 which drive the NMOS drive transistor DP and the NMOS drive transistor DN after receiving the pulse signal outputted by the selection circuit 31. The buffer 42 drives the PMOS drive transistor DP after receiving the signal outputted by the drive control unit 41. The buffer 43 drives the NMOS drive transistor DN after receiving the signal outputted by the drive control unit 41.

A source of the PMOS drive transistor DP is connected to the power terminal VDD, a gate of the PMOS drive transistor DP is connected to an output of the buffer 42, and a drain thereof is connected to the output terminal OUT. A source of the NMOS drive transistor DN is connected to the ground terminal GND, a gate of the NMOS drive transistor DN is connected to an output of the buffer 43, and a drain thereof is connected to the output terminal OUT.

Figure 2:
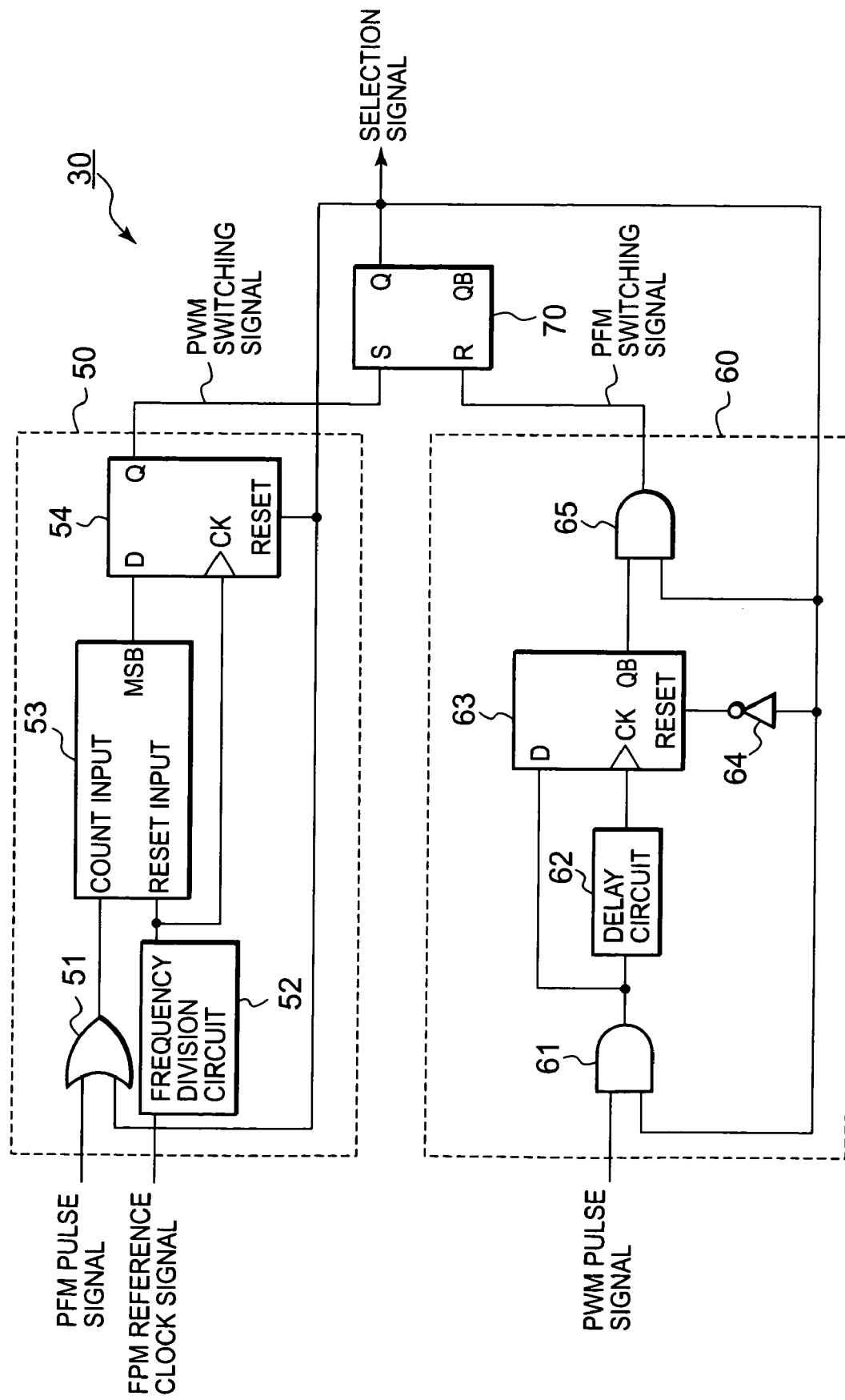
FIG. 2 is a block diagram of a switching control unit according to the first exemplary embodiment.

Here, detailed descriptions will be given of the switching control unit 30. FIG. 2 shows a block diagram of the switching control unit 30. As shown in FIG. 2, the switching control unit 30 includes a pulse number detection unit 50, a duty detection unit 60, and a state maintaining circuit 70.

The pulse number detection unit 50 outputs a second switching signal (for example, a PWM switching signal) which instructs the switching of the selection signal from the PFM mode to the PWM mode on the basis of the pulse output interval of the PWM pulse signal. The pulse number detection unit 50 includes an OR circuit 51, a frequency division circuit 52, a counter 53, and a D flip-flop 54.

The PFM pulse signal is inputted to one input terminal of the OR circuit 51, and the selection signal is inputted to the other input terminal of the OR circuit 51. Then, the OR circuit 51 interrupts the PFM pulse signal when the selection signal is at the high level (for example, in the PWM mode of the selection signal), and outputs the PFM pulse signal when the selection signal is at the low level (for example, in the PFM mode of the selection signal). The frequency division circuit 52 outputs a frequency-divided PFM reference clock signal obtained by dividing the PFM reference clock signal by use of a set division ratio after receiving the PFM reference clock signal. A count input terminal of the counter 53 is connected to an output of the OR circuit 51, and a reset input terminal of the counter 53 is connected to an output of the frequency division circuit 52. Then, the counter 53 counts the number of pulses inputted to the count input terminal when the signal inputted to the reset input terminal are at the low level, and outputs the value of a Most Significant Bit (MSB) of the count value.

A data input terminal D of the D flip-flop 54 is connected to an output of the counter 53, a clock input terminal CK of the D flip-flop 54 is connected to an output of the frequency division circuit 52, and the selection signal is inputted to a reset terminal RESET of the D flip-flop 54. The D flip-flop 54 synchronizes with the rising edge of a signal inputted to its clock input terminal CK to capture the logic level of a signal inputted to its data input terminal D and outputs the logic level from its output terminal Q. Then, the D flip-flop 54 maintains the captured logic level until the next rising edge of the signal inputted to the clock input terminal CK is inputted. Moreover, the D flip-flop 54 initializes the maintaining value (for example, to 0) when the selection signal inputted to the reset terminal RESET is at the low level, and performs the operation of capturing data synchronized with the rising edge of the signal inputted to the clock input terminal CK when the selection signal is at the high level. The signal that the D flip-flop 54 outputs from the output terminal Q is the PWM switching signal.

In other words, the pulse number detection unit 50 has a maximum count value of the counter 53 as the set value of the maximum number of pulses. Then, when the number of pulses of the PFM pulse signal inputted within a fixed measurement period from after reset cancellation to the start of the next reset state increases to or above the set value of the maximum number of pulses, the pulse number detection unit 50 switches the logic level of the PWM switching signal, and instructs the switching of the selection signal from the PFM mode to the PWM mode. The pulse output interval of the PFM pulse signal shortens when current consumption becomes large at a load connected to the output terminal OUT of the DC converter 1. Accordingly, the pulse number detection unit 50 detects an increasing tendency of current consumption at the load by counting the number of pulses of the PFM pulse signal within the fixed measurement period, and instructs the state transition of the selection signal.

The duty detection unit 60 outputs a first switching signal (for example, a PFM switching signal) which instructs the switching of the selection signal from the PWM mode to the PFM mode on the basis of the pulse width of the PWM pulse signal. The duty detection unit 60 includes OR circuits 61 and 65, a delay circuit 62, a D flip-flop 63, and an inverter 64.

The PWM pulse signal is inputted to one input terminal of the OR circuit 61, and the selection signal is inputted to the other input terminal of the OR circuit 61. Then, the OR circuit 61 interrupts the PWM pulse signal when the selection signal is at the low level (for example, in the PFM mode of the selection signal), and the PWM pulse signal is outputted when the selection signal is at the high level (for example, in the PWM mode of the selection signal).

The delay circuit 62 outputs a delayed PWM pulse signal obtained by delaying the PWM pulse signal inputted via the OR circuit 61. At this point, the delay circuit 62 has a delay time equivalent to the set value of a minimum pulse width, and outputs the delayed PWM pulse signal in accordance with the delay time.

The PWM pulse signal inputted via the OR circuit 61 is inputted to a data input terminal D of the D flip-flop 63, and the delayed PWM pulse signal outputted by the delay circuit 62 is inputted to a clock input terminal CK of the D flip-flop 63. In addition, the selection signal inverted by the inverter 64 is inputted to a reset input terminal RESET of the D flip-flop 63. The D flip-flop 63 captures the logic level of the PWM pulse signal inputted to its data input terminal D in synchronization with the rising edge of the delayed PWM pulse signal during a period when the low level (the selection signal is at the high level and shows the PWM mode.) is inputted to the reset input terminal RESET of the D flip-flop 63. Then, the D flip-flop 63 outputs from its output terminal QB a value obtained by inverting the captured value. The D flip-flop 63 maintains the value captured at a rising edge during a period from the rising edge to the next rising edge of the delayed PWM clock signal. On the other hand, the D flip-flop 63 initializes the value of its output terminal QB (for example, to 1) during a period when the high level is being inputted to the reset input terminal RESET (the selection signal is at the low level and shows the PFM mode.) of the D flip-flop 63.

A signal outputted by the D flip-flop 63 is inputted to one input terminal of the OR circuit 65, and the selection signal is inputted to the other input terminal thereof. Then, the OR circuit 65 interrupts the signal outputted by the D flip-flop 63 when the selection signal is at the low level (for example, in the PFM mode of the selection signal), and outputs the signal outputted by the D flip-flop 63 when the selection signal is at the high level (for example, in the PWM mode of the selection signal). The signal outputted by the OR circuit 65 is the PFM switching signal.

The duty detection unit 60 determines the magnitude of the pulse width of the PWM pulse signal by determining the logic level of the PWM pulse signal in synchronization with the rising edge of the delayed PWM pulse signal. The PWM pulse signal increases in duty ratio when current consumption at the load becomes large, and decreases in duty ratio when current consumption at the load becomes small. Hence, the duty detection unit 60 has a delay time in the delay circuit 62 as the set value of a minimum pulse width, and outputs the PFM switching signal when the pulse width of the PWM pulse signal falls to or below the minimum pulse width. Accordingly, when the current consumption at the load decreases, the duty detection unit 60 outputs the PFM switching signal which instructs the transition of the selection signal from the PWM mode to the PFM mode.

The state maintaining circuit 70 maintains a state instructed by the PWM switching signal and the PFM switching signal, and outputs the maintaining state as the selection signal. In the exemplary embodiment, a set/reset latch circuit is used as the state maintaining circuit 70. The PWM switching signal is inputted to a set terminal S of the set/reset latch circuit, and the PFM switching signal is inputted to a reset terminal R of the set/reset latch circuit. The set/reset latch circuit switches the logic level of the selection signal outputted from its output terminal Q from the low to the high level when the rising edge of the PWM switching signal is inputted to the set terminal S of the set/reset latch circuit. Furthermore, the set/reset latch circuit switches the logic level of the selection signal outputted from its output terminal from the high to the low level when the rising edge of the PFM switching signal is inputted to the reset terminal R of the set/reset latch circuit. Then, the set/reset latch circuit maintains the current state until the next rising edge is inputted to its set terminal S or its reset terminal R.

Figure 3:
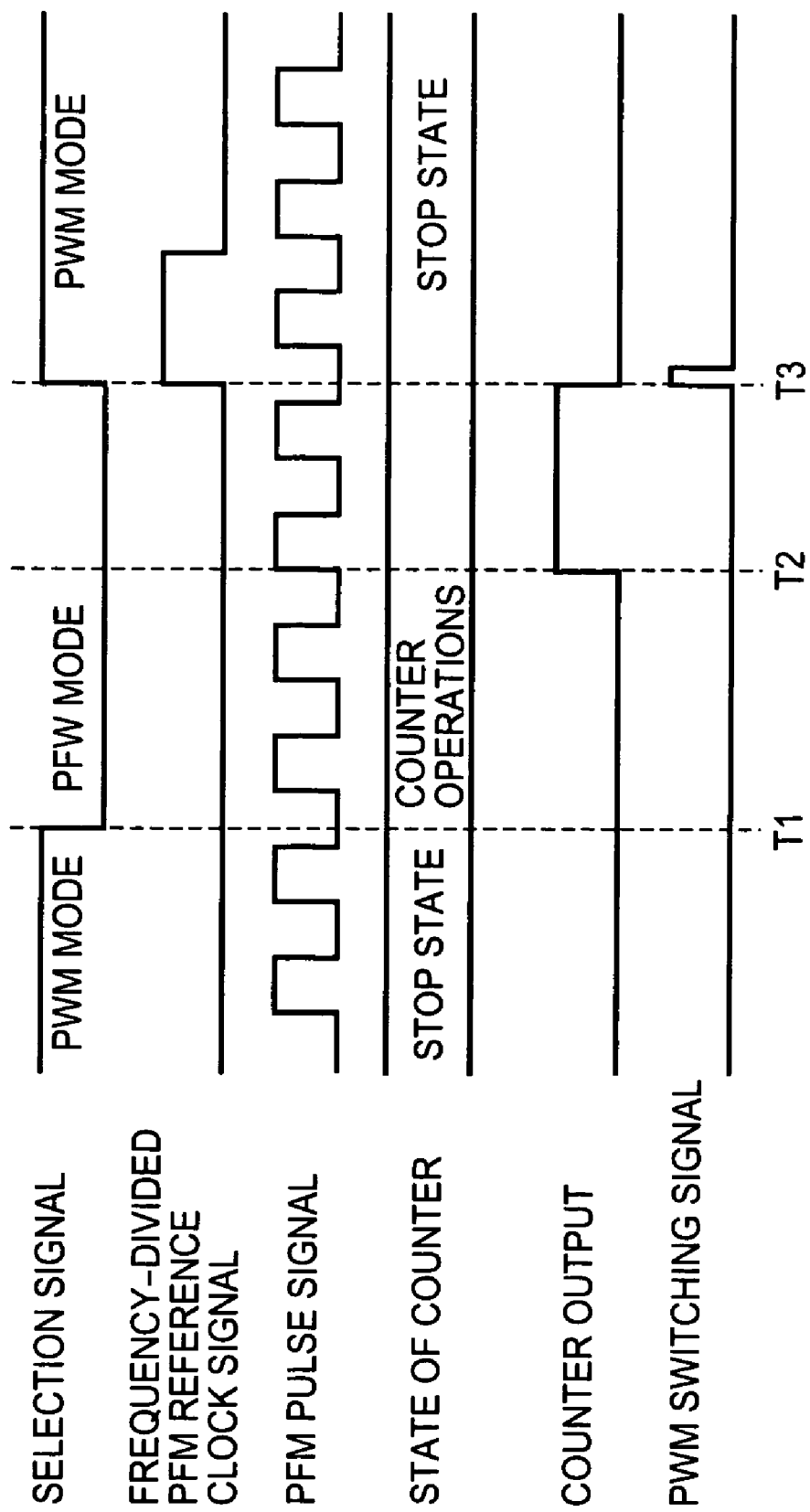
FIG. 3 is a timing chart showing state transition operations from a PFM mode to a PWM mode in the DC converter according to the first exemplary embodiment.

Next, descriptions will be given of the operations of the DC converter 1 focusing on the operations of the switching control unit 30. FIG. 3 shows a timing chart of when the selection signal transitions from the PFM mode to the PWM mode. Please note that when the selection signal transitions from the PFM mode to the PWM mode, the duty detection unit 60 is in a stopped state and, therefore, the operations of the pulse number detection unit 50 are mainly shown here.

As shown in FIG. 3, when the current consumption of the load decreases and the selection signal transitions from the PWM mode (the high level) to the PFM mode (the low level) at a timing T1, the PFM pulse signal is inputted to the counter 53 and, therefore, the reset state of the counter 53 is cancelled. Then, the counter 53 counts the number of pulses of the PWM pulse signal inputted after the timing T1. Afterwards, when the third PWM pulse signal from a start of counting is inputted at a timing T2, the value of the MSB of the count value outputted from the counter 53 is switched from the low to the high level. The value of the MSB is captured by the D flip-flop 54 at the rising edge of the frequency-divided PFM reference clock signal at a timing T3. Accordingly, the PWM switching signal outputted from the D flip-flop 54 is switched from the low level to the high level and, therefore, the state maintaining circuit 70 puts the selection signal in the PWM mode by switching the selection signal from the low level to the high level. The operations from the timings T1 to T3 cause the DC converter 1 to operate in PFM mode during a period from the timings T1 to T3. On the other hand, the DC converter 1 operates in PWM mode before the timing T1 and after the timing T3.

Note that when the pulse output interval of the PFM pulse signal is short and the MSB does not rise to the high level within a measurement period from the timings T1 to T3, the logic level of the PWM switching signal is not switched at the timing T3. In this case, the counter 53 is reset during a period when the frequency-divided PFM reference clock signal is at the high level after the timing T3, and the reset is cancelled at the falling edge of the frequency-divided PFM reference clock. Hence, the counter 53 counts the number of pulses of the PFM pulse signal while setting as the measurement period a period from after the reset cancellation to the rising edge of the next frequency-divided PFM reference clock signal.

Figure 4:
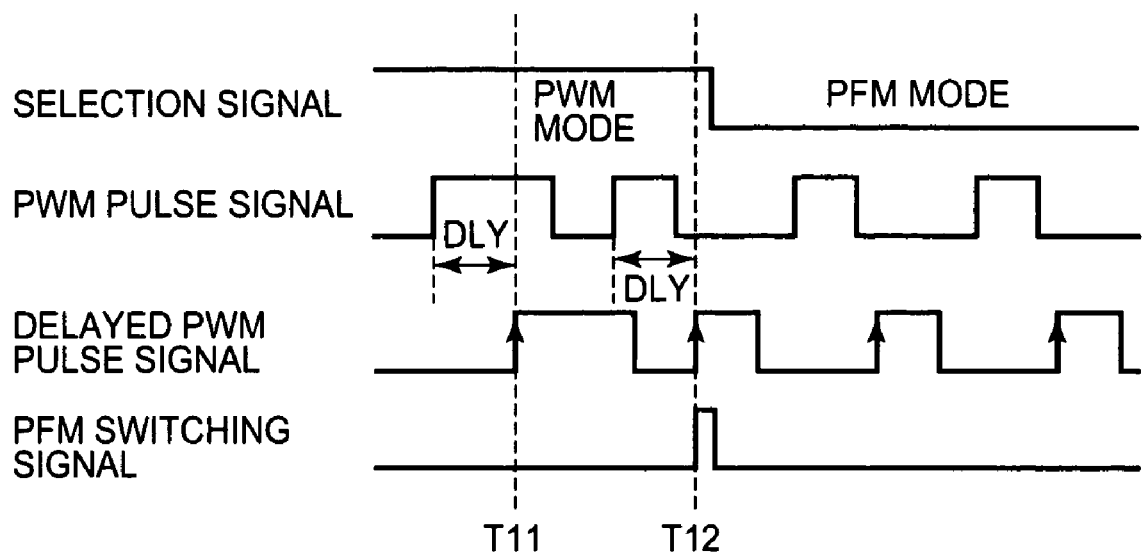
FIG. 4 is a timing chart showing state transition operations from the PWM mode to the PFM mode in the DC converter according to the first exemplary embodiment.

Next, FIG. 4 shows a timing chart of when the selection signal transitions from the PWM mode to the PFM mode. Note that when the selection signal transitions from the PWM mode to the PFM mode, the pulse number detection unit 50 is in a stopped state and, therefore, the operations of the duty detection unit 60 are mainly shown here.

As shown in FIG. 4, at a timing T11, the D flip-flop 63 captures the logic level of the PWM pulse signal in synchronization with the rising edge of the delayed PWM pulse signal. Since the PWM pulse signal is at the high level at the timing T11, the PFM switching signal falls to the low level.

On the other hand, at a timing T12, the D flip-flop 63 captures the logic level of the PWM pulse signal in synchronization with the rising edge of the delayed PWM pulse signal. Since the duty ratio of the PWM pulse signal decreases at the timing T12, the D flip-flop 63 captures the low level, and switches the PFM switching signal from the low level to the high level. Afterwards, the selection signal falls in response to the switching of the logic level of the PFM switching signal at the timing T12. Accordingly, the selection signal goes into PFM mode. Moreover, since one input of the OR circuit 65 goes to the low level in response to the switching of the logic level of the selection signal, the signal from the D flip-flop 63 to the state maintaining circuit 70 is interrupted. Furthermore, the PFM switching signal outputted by the OR circuit 65 goes to the low level. Note that at this point, the reset signal inputted to the D flip-flop 63 goes to the high level, too, and the D flip-flop 63 is reset, too. Therefore, the DC converter 1 operates in PWM mode before the timing T12 when current consumption at the load is large, and in PFM mode after the timing T12 when current consumption at the load is small.

Note that when a state where the duty ratio of the PWM pulse signal is high continues, the operation at the timing T11 is continuously performed in synchronization with the rising edge of the delayed PWM pulse signal. Then, when the pulse width of the PWM pulse signal becomes shorter than a delay time DLY (the set value of a minimum pulse width) at the delay circuit 62, the operations at the timings T12 and T13 are performed, and the logic levels of the PFM switching signal and the selection signal are switched.

From the above descriptions, in the DC converter 1 according to the exemplary embodiment, the switching control unit 30 detects the decreasing tendency of current consumption at the load on the basis of the duty ratio of the PWM pulse signal, and switches the operation mode from the PWM mode to the PFM mode. In addition, the switching control unit 30 detects the increasing tendency of current consumption of the load on the basis of the pulse output interval of the PFM pulse signal, and switches the operation mode from the PFM mode to the PWM mode. Accordingly, at the time of a low load (when the current consumption of the load is small), the DC converter 1 can operate in PFM mode where the high efficiency of power conversion is achieved for the low load, and, in accordance with an increase in the current consumption of the load, the DC converter 1 can switch the operation to the PWM mode where the high efficiency of power conversion can be achieved at a high load (when the current consumption of the load is large). Moreover, the DC converter 1 can switch the operation mode to the PFM mode, if the current consumption of the load indicates a decreasing tendency when operating in PWM mode. Accordingly, the DC converter 1 can control the operation mode with high accuracy in accordance with the magnitude of the load and can maintain the high efficiency of power conversion in a wide range of load changes. Furthermore, it is possible to reduce power consumption at the DC converter 1 since the high efficiency of power conversion is achieved.

In addition, at the switching control unit 30, a load change in PFM mode and a load change in PWM mode are separately made by the pulse number detection unit 50 and the duty detection unit 60, respectively. Accordingly, it is possible to separately control a switching condition from the PFM mode to the PWM mode and a switching condition from the PWM mode to the PFM mode. In this manner, it is possible to separately set a condition and, therefore, it is possible to increase flexibility in each setting upon design.

Exemplary Embodiment 2

Figure 5:
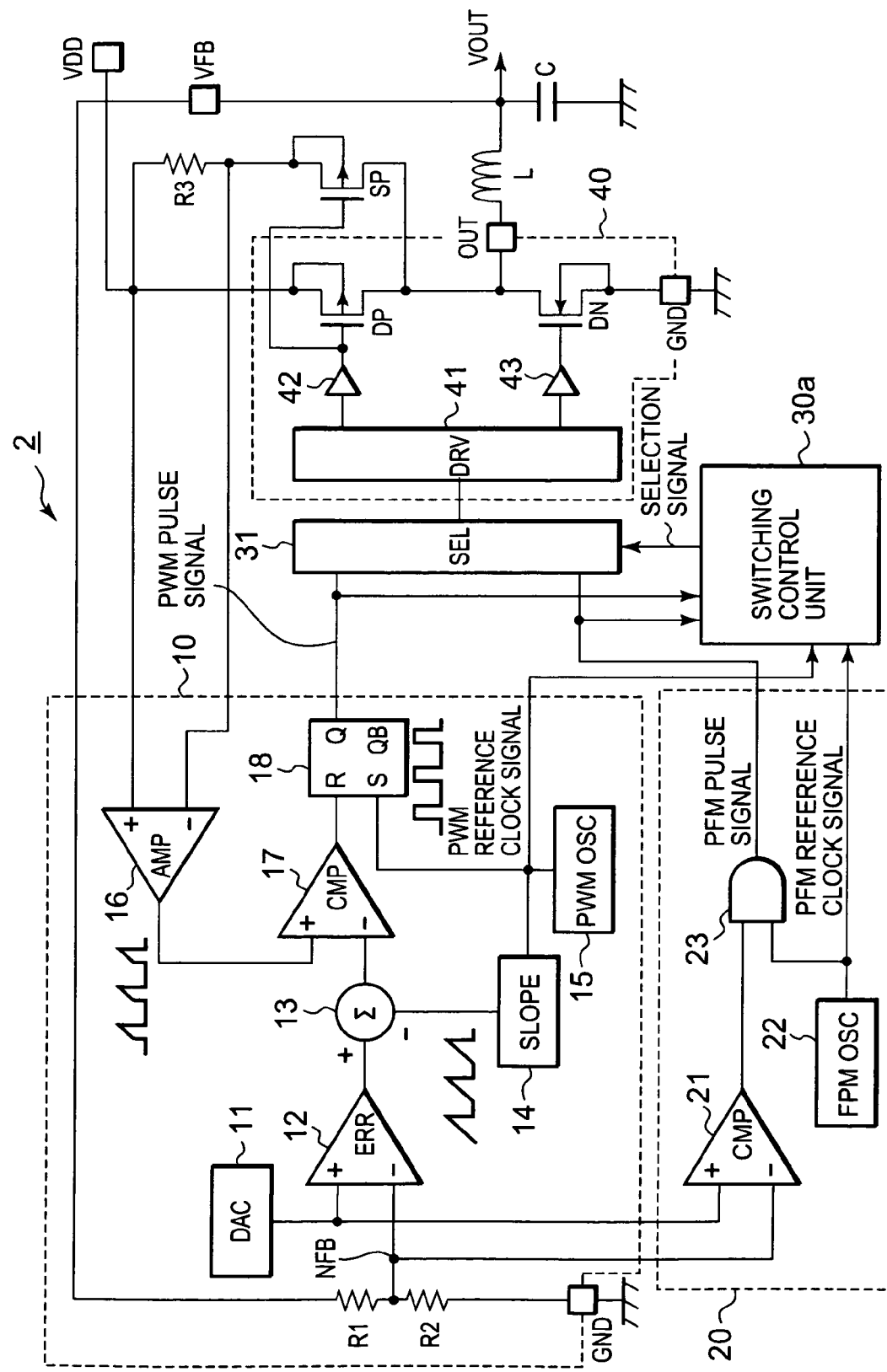
FIG. 5 is a block diagram of a DC converter according to a second exemplary embodiment.
Figure 6:
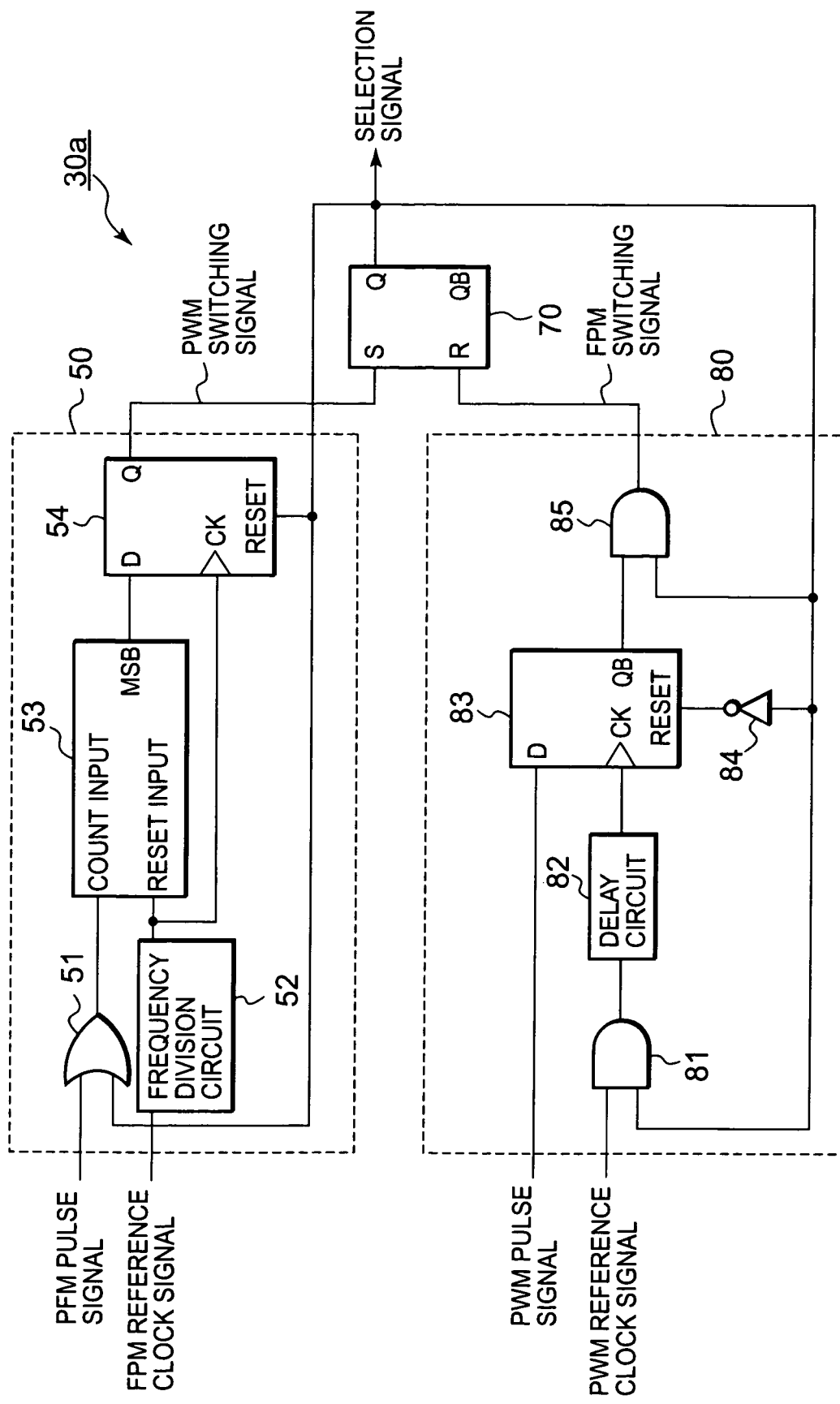
FIG. 6 is a block diagram of a switching control unit according to the second exemplary embodiment.

FIG. 5 shows a block diagram of a DC converter 2 according to a second exemplary embodiment. As shown in FIG. 5, the DC converter 2 includes a switching control unit 30a whose configuration is different from that of the switching control unit 30 of the DC converter 1 according to the first exemplary embodiment. A PWM reference clock signal is added as an input signal to the switching control unit 30a. FIG. 6 shows a block diagram of the switching control unit 30a.

As shown in FIG. 6, the switching control unit 30a includes a pulse number detection unit 50 and a state maintaining circuit 70, which have the same configurations as those of the switching control unit 30 in the first exemplary embodiment, and a duty detection unit 80, which has a different configuration from that of the duty detection unit 60 of the switching control unit 30.

The duty detection unit 80 essentially operates in the same manner as the duty detection unit 60, but signal used for the detection of a duty ratio of the PWM pulse signal are different. The duty detection unit 80 includes OR circuits 81 and 85, a delay circuit 82, and a D flip-flop 83, and an inverter 84.

The PWM reference clock signal is inputted to one input terminal of the OR circuit 81, and the selection signal is inputted to the other input terminal of the OR circuit 81. Then, the OR circuit 81 interrupts the PWM reference clock signal when the selection signal is at the low level (for example, in the PFM mode of the selection signal), and outputs the PWM reference clock signal when the selection signal is at the high level (for example, in the PWM mode of the selection signal).

The delay circuit 82 outputs a delayed PWM reference clock signal obtained by delaying the PWM reference clock signal inputted via the OR circuit 81. At this point, the delay circuit 82 has a delay time equivalent to a set value of a minimum pulse width, and outputs the delayed PWM reference clock signal in accordance with the delay time.

The PWM pulse signal is inputted to a data input terminal D of the D flip-flop 83, and the delayed PWM reference clock signal outputted by the delay circuit 82 is inputted to a clock input terminal CK of the D flip-flop 83. Moreover, the selection signal inverted by the inverter 84 is inputted to a reset input terminal RESET of the D flip-flop 83. The D flip-flop 83 captures the logic level of the PWM pulse signal inputted to its data input terminal D in synchronization with the rising edge of the delayed PWM reference clock signal during a period when the low level (the selection signal is at the high level and shows the PWM mode) is inputted to the reset input terminal RESET of the D flip-flop 83. Then, the D flip-flop 83 outputs a value obtained by inverting the captured value from an output terminal QB of the D flip-flop 83. The D flip-flop 83 maintains the valued captured at the rising edge during a period from the rising edge to the next rising edge of the delayed PWM reference clock signal. On the other hand, the D flip-flop 83 initializes the value of its output terminal QB (for example, to 1) during a period when the high level is inputted to the reset input terminal RESET (the selection signal is at the low level, and shows the PFM mode) of the D flip-flop 83.

A signal outputted by the D flip-flop 83 is inputted to one input terminal of the OR circuit 85, and the selection signal is inputted to the other input terminal of the OR circuit 85. Then, the OR circuit 85 interrupts the signal outputted by the D flip-flop 83 when the selection signal is at the low level (for example, in the PFM mode of the selection signal), and outputs the signal outputted by the D flip-flop 83 when the selection signal is at the high level (for example, in the PWM mode of the selection signal). The signal outputted by the OR circuit 85 is the PFM switching signal.

Figure 7:
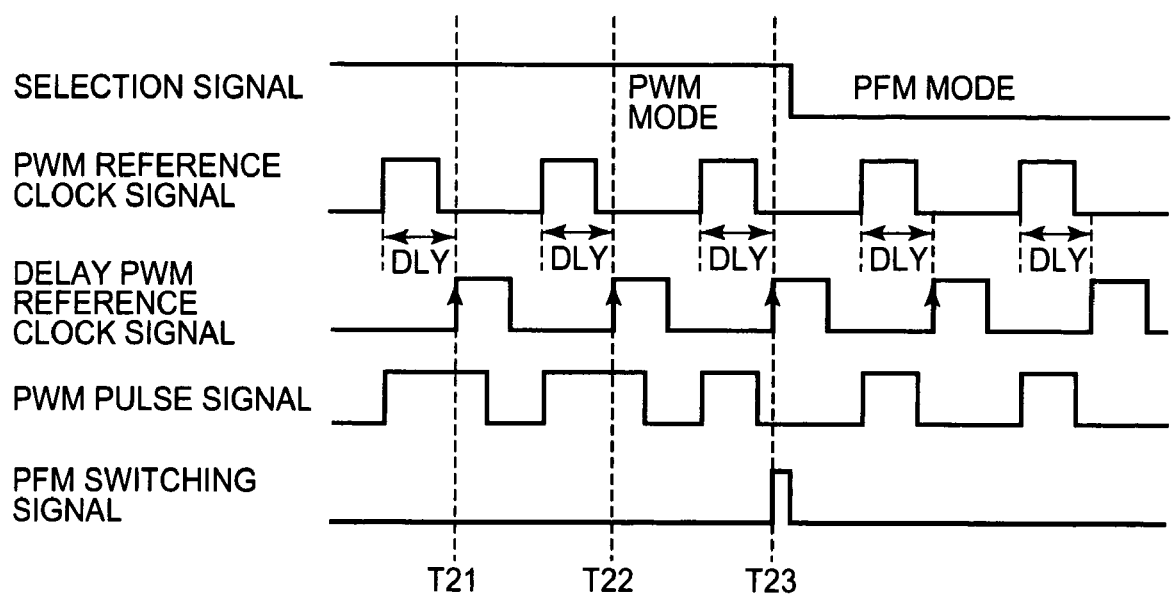
FIG. 7 is a timing chart showing state transition operations from a PWM mode to a PFM mode in the DC converter in the second exemplary embodiment.
Figure 8:
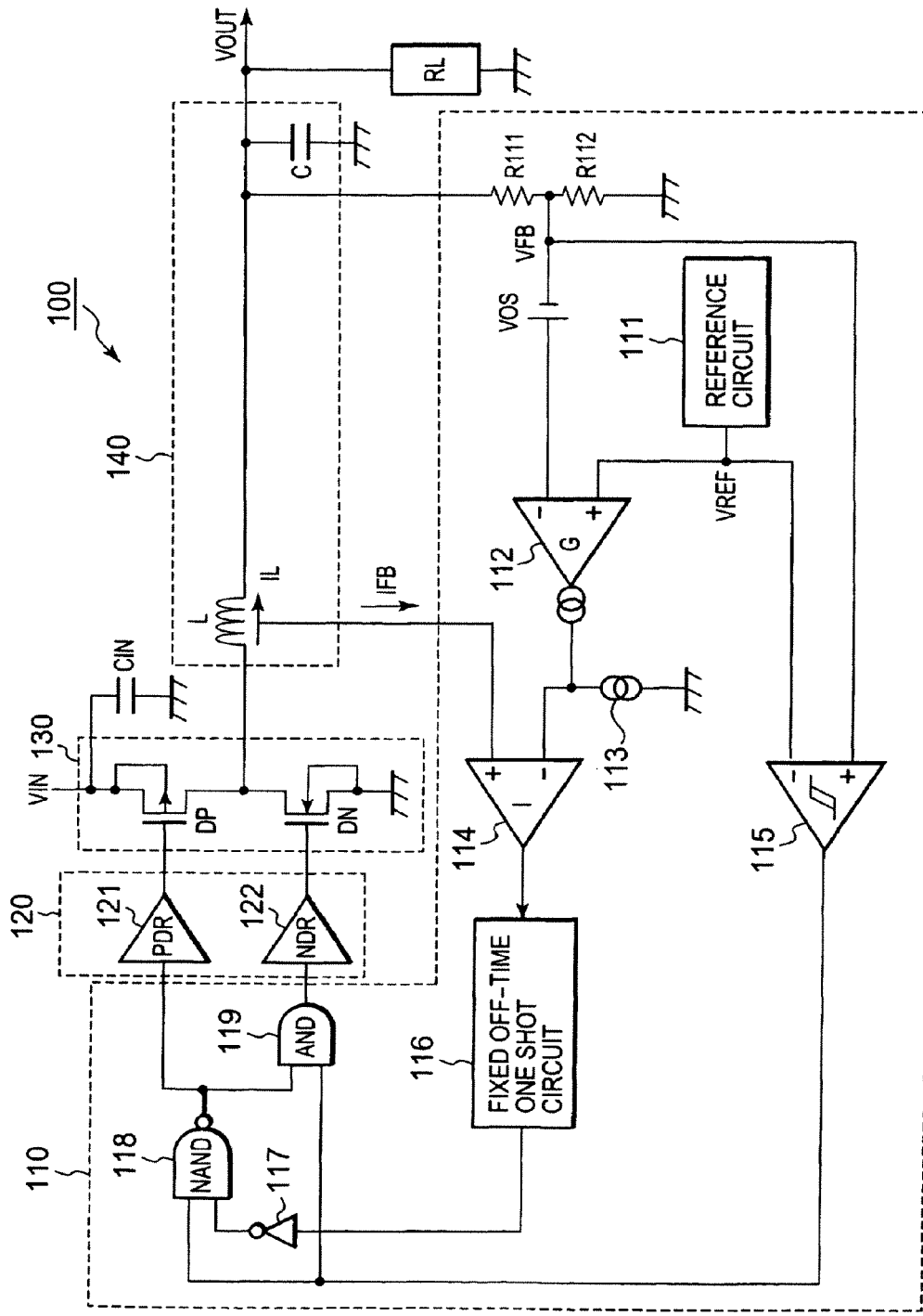
FIG. 8 is a block diagram of a conventional switching regulator 100.

Here, FIG. 7 shows a timing chart of when the selection signal transitions from the PWM mode to the PFM mode in a case of using the duty detection unit 80. Note that when the selection signal transitions from the PWM mode to the PFM mode, the pulse number detection unit 50 is in a stopped state and, therefore, the operations of the duty detection unit 80 are mainly shown here.

As shown in FIG. 7, at a timing T21, the D flip-flop 83 captures the logic level of the PWM pulse signal in synchronization with the rising edge of the delayed PWM reference clock signal. Since the PWM pulse signal is at the high level at the timing T21, the PFM switching signal goes to the low level. Furthermore, the same operations as those at the timing T21 are repeated at a timing T22, too.

On the other hand, at a timing T23, the D flip-flop 83 captures the logic level of the PWM pulse signal in synchronization with the rising edge of the delayed PWM reference clock signal. Since the duty ratio of the PWM pulse signal is decreased at the timing T23, the D flip-flop 83 captures the low level and switches the PFM switching signal from the low level to the high level. The selection signal falls in response to the switching of the logic level of the PFM switching signal at the timing T23. Accordingly, the selection signal goes into PFM mode. In addition, one input of the OR circuit 85 goes to the low level in response to the switching of the logic level of the selection signal and, therefore, the signal from the D flip-flop 83 to the state maintaining circuit 70 is interrupted. Moreover, the PFM switching signal outputted by the OR circuit 85 goes to the high level. Note that at this point, the reset signal inputted to the D flip-flop 83 goes to the high level, too, and the D flip-flop 83 is reset, too. Therefore, the DC converter 1 operates in PWM mode before the timing T23 when the current consumption of the load is large, and operates in PFM mode after the timing T23 when the current consumption of the load is small.

The rising edge of the PWM pulse signal has a timing in synchronization with the PWM reference clock signal. Therefore, when the D flip-flop 83 is a flip-flop of a rising edge trigger type in the duty detection unit, even if the configuration of the duty detection unit 60 is changed to that of the duty detection unit 80, the timing of capturing data at the ]D flip-flop 83 does not change. In other words, it is possible to consider 80 as a modification example of the duty detection unit in the second exemplary embodiment.

Note that the present invention is not limited to the above exemplary embodiments, and that it is possible to make changes as appropriate within a range where they do not depart from a spirit of the present invention.

Further, it is noted that Applicant's intent is to encompass equivalents of all claim elements, even if amended later during prosecution.

What is claimed is:

1. A direct current (DC) converter, comprising:
   a PWM (Pulse Width Modulation) pulse generation unit which outputs a PWM pulse signal having a duty ratio controlled in accordance with an output voltage;
   a PFM (Pulse Frequency Modulation) pulse generation unit which outputs a PFM pulse signal including a pulse output interval controlled in accordance with the output voltage;
   a selection circuit which selects and outputs any one of the PWM pulse signal and the PFM pulse signal in accordance with a selection signal;
   a drive circuit unit which drives a load, and generates an output voltage on a basis of a signal outputted from the selection circuit; and
   a switching control unit which outputs the selection signal,
   wherein when the selection signal is in a second state which instructs to select the PFM pulse signal, the switching control unit detects a number of pulses of the PFM pulse signal within one measurement period that increases to equal or greater than a set value of a maximum number of pulses, and switches the selection signal to a first state which instructs to select the PWM pulse signal,
   wherein the switching control unit includes a counter counting a number of pulses of the PWM pulse signal within the one measurement period, and the counter switches the selection signal to the first state when the pulses of the PFM pulse signal, the number of which is equal to or greater than the set value of the maximum number of pulses, are inputted within the one measurement period,
   wherein the PFM pulse generation unit includes:
      a PFM reference clock generation unit which outputs a PFM reference clock signal; and
      a gating circuit which thins out the PFM reference clock signal in accordance with a value of the output voltage, and generates the PFM pulse signal,
   wherein the switching control unit includes a frequency-divided PFM reference clock signal,
   wherein the counter is reset in accordance with a logic level of the frequency-divided PFM reference clock signal; and
   wherein the one measurement period is set as a period from cancellation of the counter reset to a start of a next reset state of the counter.

2. A direct current (DC) converter, comprising;
   a PWM (Pulse Width Modulation) pulse generation unit which outputs a PWM pulse signal having a duty ratio controlled in accordance with an output voltage;

a PFM (Pulse Frequency Modulation) pulse generation unit which outputs a PFM pulse signal including a pulse output interval controlled in accordance with the output voltage;

a selection circuit which selects and outputs any one of the PWM pulse signal and the PFM pulse signal on a basis of a selection signal;

a drive circuit unit which drives a load, and generates an output voltage on a basis of a signal outputted from the selection circuit; and a switching control unit which outputs the selection signal, wherein when the selection signal is in a first state which instructs to select the PWM pulse signal, the switching control unit detects a pulse width of the PWM pulse signal that falls to equal or less than a set value of a minimum pulse width, and switches the selection signal to a second state which instructs to select the PWM pulse signal, and wherein the switching control unit includes a delay circuit generating a delayed PWM pulse signal by delaying the PWM pulse signal by a delay time corresponding to the set value of the minimum pulse width, and switches the selection signal to the second state in accordance with a signal level of the PWM pulse signal in synchronization with an edge of the delayed PWM pulse signal.

3. A direct current (DC) converter, comprising:

a PWM (Pulse Width Modulation) pulse generation unit which outputs a PWM pulse signal having a duty ratio controlled in accordance with an output voltage;

a PFM (Pulse Frequency Modulation) pulse generation unit which outputs a PFM pulse signal including a pulse output interval controlled in accordance with the output voltage;

a selection circuit which selects and outputs any one of the PWM pulse signal and the PFM pulse signal on a basis of a selection signal;

a drive circuit unit which drives a load, and generates an output voltage on a basis of a signal outputted from the selection circuit; and a switching control unit which outputs the selection signal, wherein when the selection signal is in a first state which instructs to select the PWM pulse signal, the switching control unit detects a pulse width of the PWM pulse signal that falls to equal or less than a set value of a minimum pulse width, and switches the selection signal to a second state which instructs to select the PWM pulse signal, wherein the PWM pulse generation unit includes a PWM reference clock generation unit generating a PWM reference clock signal in synchronization with an edge of the PWM pulse signal, and wherein the switching control unit includes a delay circuit generating a delayed PWM pulse signal obtained by delaying the PWM reference clock signal by a delay time corresponding to the set value of the minimum pulse width, and switches the selection signal to the second state in accordance with a logic level of the PWM pulse signal in synchronization with an edge of the PWM reference clock signal.

4. A direct current (DC) converter operating in a plurality of selectable operation modes, the DC converter comprising:

a pulse width modulation (PWM) pulse generation unit which generates a PWM pulse signal having a duty ratio controlled based on an output voltage of the DC converter;

a pulse frequency modulation(PFM) pulse generation unit which generates a PFM pulse signal including a pulse output interval controlled based on the output voltage;

a switching control unit which monitors one of the PWM pulse signal outputted from the PWM pulse generation unit and the PFM pulse signal outputted from the PFM pulse generation unit, corresponds to a current operation mode, to determine the operation mode, and generates a selection signal corresponding to the determined operation mode;

a selector which receives the PWM pulse signal and the PFM pulse signal to select one of the PWM pulse signal and the PFM pulse signal in response to the selection signal; and a drive control unit which receives one of the PWM pulse signal and the PFM pulse signal from the selector to generate the output voltage, wherein the switching control unit, when the operation mode is in a first mode which indicates that the PWM pulse signal is selected, compares a pulse width of the PWM pulse signal with a set value of a minimum pulse width to generate the selection signal indicative of the PFM pulse signal, and wherein the switching control unit, when the operation mode is in a second mode which indicates that the PFM pulse signal is selected, compares a number of pulses of the PFM pulse signal within one measurement period with a set value of a maximum number of pulses to generate the selection signal indicative of the PWM pulse signal.

5. The DC converter according to claim 4, wherein the switching control unit comprises:

a pulse number detection unit which outputs a first switching signal which instructs the switching of the operation mode from the first mode to the second mode on a basis of the pulse width of the PWM pulse signal outputted from the PWM pulse generation unit; and a duty detection unit which outputs a second switching signal which instructs the switching of the operation mode from the second mode to the first mode on a basis of the number of pulses of the PFM pulse signal outputted from the PFM pulse generation unit, wherein the selection signal is generated in response to the first switching signal and the second switching signal.

6. The DC converter according to claim 5, wherein the pulse number detection unit includes a counter counting a number of pulses of the PFM pulse signal within the one measurement period, wherein the counter switches a logic level of the first switching signal when the pulses of the PFM pulse signal, the number of which is equal to or greater than the set value of the maximum number of pulses, are inputted within the one measurement period, and wherein the duty detection unit includes a delay circuit generating a delayed PWM pulse signal by delaying the PWM pulse signal by a delay time corresponding to the set value of the minimum pulse width, and switches a logic level of the second switching signal in accordance with a signal level of the PWM pulse signal in synchronization with an edge of the delayed PWM pulse signal.

7. The DC converter according to claim 5, wherein the pulse number detection unit includes a counter counting a number of pulses of the PFM pulse signal within the one measurement period, wherein the counter switches a logic level of the first switching signal when the pulses of the PFM pulse signal, the number of which is equal to or greater than the set value of the maximum number of pulses, are inputted within the one measurement period, wherein the duty detection unit includes a PWM reference clock generation unit generating a PWM reference clock signal in synchronization with an edge of the PWM pulse signal, and wherein the switching control unit includes a delay circuit generating a delayed PWM reference clock signal obtained by delaying the PWM reference clock signal by a delay time corresponding to the set value of the minimum pulse width, and switches a logic level of the second switching signal in accordance with a logic level of the PWM pulse signal in synchronization with an edge of the delayed PWM reference clock signal.

8. A direct current (DC) converter which operates in a plurality of selectable operation modes, the DC converter comprising:

a drive control unit which receives a control signal corresponding to a operation mode to generate an output voltage;

a PWM (Pulse Width Modulation) pulse generation unit which generates the PWM pulse signal having a duty ratio controlled based on the output voltage when the control signal corresponds to the PWM pulse signal;

a PFM (Pulse Frequency Modulation) pulse generation unit which generates the PFM pulse signal including a pulse output interval controlled based on the output voltage when the control signal corresponds to the PFM pulse signal; and a switching control unit which monitors one of the PWM pulse signal outputted from the PWM pulse generation unit and the PFM pulse signal outputted from the PFM pulse generation unit, corresponds to the control signal inputted the drive control unit, and determines the operation mode in response to a result of the monitoring, wherein the switching control unit, when the operation mode is in a first mode which indicates that the control signal corresponding to the PWM pulse signal is inputted to the drive control unit, compares a pulse width of the PWM pulse signal with a set value of a minimum pulse width to generate the control signal indicative of the PFM pulse signal, and wherein the switching control unit, when the operation mode is in a second mode which indicates that the control signal corresponding to the PFM pulse signal is inputted to the drive control unit, compares a number of pulses of the PFM pulse signal within one measurement period with a set value of a maximum number of pulses to generate the control signal indicative of the PWM pulse signal.

* * * * *